US012686355B2

(12) United States Patent
Lee et al.

(10) Patent No.: US 12,686,355 B2
(45) Date of Patent: Jul. 21, 2026

(54) ROOF AIRBAG FOR VEHICLE

(71) Applicant: HYUNDAI MOBIS CO., LTD., Seoul
(KR)

(72) Inventors: Seok Min Lee, Seoul (KR); **Dong
Young Kim, Hwaseong-si (KR); Dong
Joon Lee**, Yongin-si (KR)

(73) Assignee: Hyundai Mobis Co., Ltd., Seoul (KR)

( * ) Notice: Subject to any disclaimer, the term of this
patent is extended or adjusted under 35
U.S.C. 154(b) by 0 days.

(21) Appl. No.: 19/215,268

(22) Filed: May 21, 2025

(65) Prior Publication Data

US 2026/0042415 A1     Feb. 12, 2026

(30) Foreign Application Priority Data

Aug. 6, 2024     (KR) ......................... 10-2024-0104696

(51) Int. Cl.
B60R 21/2338     (2011.01)
B60R 21/214     (2011.01)
B60R 21/16     (2006.01)

(52) U.S. Cl.
CPC ........ B60R 21/2338 (2013.01); B60R 21/214
(2013.01); *B60R 2021/161* (2013.01); *B60R
2021/23382* (2013.01)

(58) Field of Classification Search
CPC . B60R 21/2338; B60R 21/214; B60R 21/232;
B60R 21/213; B60R 2021/23382; B60R
2021/161; B60R 2021/23192
USPC ............................................ 280/743.2, 730.1
See application file for complete search history.

(56) References Cited

U.S. PATENT DOCUMENTS

2010/0133798 A1 *   6/2010   Fukawatase ........ B60R 21/2338
280/743.2

FOREIGN PATENT DOCUMENTS

DE       102015005482 A1 *   3/2016   .......... B60R 21/239
JP       2015229374 A   * 12/2015
WO       WO-2024137190 A1 *   6/2024   ............. B60R 21/21

* cited by examiner

*Primary Examiner* — Keith J Frisby
(74) *Attorney, Agent, or Firm* — NSIP Law

(57) ABSTRACT

A roof airbag for a vehicle includes an airbag module
arranged on a roof adjacent a windshield glass of the vehicle
and including an airbag chamber, and a plurality of tethers
arranged in the airbag chamber in a manner of crossing each
other, and each tether having a first end connected to a fixed
point of the airbag module and a second end connected to an
inner side of the airbag chamber to deploy together during
deployment of the airbag chamber.

19 Claims, 8 Drawing Sheets interior side          exterior side interior side exterior

901    902    W interior side                    exterior 100    300    10    C

FIG. 8 interior side    exterior side

ROOF AIRBAG FOR VEHICLE

CROSS REFERENCE TO RELATED APPLICATION

The present application claims priority to Korean Patent Application No. 10-2024-0104696, filed on Aug. 6, 2024, the entire contents of which is incorporated herein for all purposes by this reference.

BACKGROUND

Field of the Disclosure

The present disclosure relates to a roof airbag for a vehicle.

Description of the Related Art

Airbags installed in vehicles are designed to prevent injuries to occupants in the event of a collision with an external object. Depending on the installation location, airbags may be categorized into driver airbags (DAB), passenger airbags (PAB), curtain airbags (CAB), knee airbags (KAB), and the like.

In particular, as an autonomous driving technology advances, vehicle interiors are designed to have various spaces, and airbags are also designed to protect occupants accordingly. Therefore, roof airbags that are installed on the roof of the vehicle and deploy from the roof of the vehicle have the advantage of efficiently protecting occupants in various vehicle interiors, and research on the roof airbags is actively being conducted.

The foregoing is intended merely to aid in the understanding of the background of the present disclosure, and is not intended to mean that the present disclosure falls within the purview of the related art that is already known to those skilled in the art.

SUMMARY

Roof-mounted airbags on the passenger or driver side, unlike IP-mounted airbags, are mounted above the headliner and deploy along the windshield glass in operation. As a result, the airbag chamber is affected by the curvature of the windshield glass, which may cause the airbag chamber to be eccentric toward the interior (inboard) side of the vehicle when deployed.

The present disclosure is proposed to solve the above and other problems, and aims at providing a roof airbag capable of suppressing the phenomenon that the roof airbag chamber becomes eccentric in a specified direction of the vehicle when deployed.

The technical problems to be solved by the present disclosure are not limited to the technical problems mentioned above, and other technical problems not mentioned will become apparent to one having ordinary knowledge in the technical field to which the present disclosure belongs from the following description.

In order to accomplish the above objective, according to an aspect of the present disclosure, there is provided a roof airbag for a vehicle, including: an airbag module arranged on a roof adjacent a windshield glass of the vehicle and including an airbag chamber; and a plurality of tethers arranged in the airbag chamber in a manner of crossing each other, and each tether having a first end connected to a fixed point of the airbag module and a second end connected to the inner side of the airbag chamber to deploy together during deployment of the airbag chamber.

The airbag chamber may be deployed toward the windshield glass.

The airbag module may be arranged in a space above the headliner.

The airbag module may further include: an airbag housing in which the airbag chamber is arranged; and an inflator arranged in the airbag housing to supply gases to the airbag chamber, wherein the first end of each tether is connected to the inflator.

When the airbag chamber is deployed, the second end of each tether may be disposed at a lowermost end of the airbag chamber, a contact point of the airbag chamber with the windshield glass, or a point therebetween.

The first ends of the tethers may be provided on the same plane.

The tethers may be provided in a single pair so that the first ends of the tethers are connected to the inflator and the second ends of the tethers are located at a lowermost end of the airbag chamber when the airbag chamber is deployed.

The tethers may be provided in a single pair so that the tethers of the pair of tethers have different lengths.

The pair of tethers may include a vehicle interior side tether having an end facing the vehicle interior side, and a vehicle exterior side tether having an end facing the vehicle exterior side, wherein the vehicle interior side tether is shorter than the vehicle exterior side tether.

The tethers may include a pair of first tethers and a pair of second tethers, wherein the second tethers are shorter than the first tethers.

The first ends of the first tethers and the second tethers may be connected to the inflator and the second ends of the first tethers and the second tethers may be connected to the inner side of the airbag chamber so that the second ends of the second tethers are disposed higher than the second ends of the first tethers when the airbag chamber is deployed.

The second ends of the first tethers may be located at the lowermost end of the airbag chamber when the airbag chamber is deployed, and the second ends of the second tethers may be located at a contact point of the windshield glass with the airbag chamber when the airbag chamber is deployed.

The pair of first tethers may include a first vehicle interior side tether having an end facing the vehicle interior side, and a first vehicle exterior side tether having an end facing the vehicle exterior side, wherein the first vehicle interior side tether is shorter than the first vehicle exterior side tether.

The pair of second tethers may include a second vehicle interior side tether having an end facing the vehicle interior side, and a second vehicle exterior side tether having an end facing the vehicle exterior side, wherein the second vehicle interior side tether is shorter than the second vehicle exterior side tether.

According to the roof airbag of the present disclosure, the plurality of tethers arranged in the airbag chamber in a way of crossing each other may suppress the eccentric deployment of the airbag chamber in a specified direction when the airbag chamber is deployed, thereby effectively protecting the vehicle occupants.

It will be appreciated by those skilled in the art that the effects that can be achieved with the present disclosure are not limited to those described above and other advantages of the present disclosure will be clearly understood from the following detailed description.

BRIEF DESCRIPTION OF THE DRAWINGS

FIG. 4 is a view seen from the top of the vehicle, illustrating the state in which the eccentric deployment of the airbag chamber during deployment is restrained by a plurality of tethers, resulting in normal deployment.

FIG. 6 is a view seen from the top of the vehicle, illustrating the normal situation before the airbag chamber is deployed.

FIG. 7 is a view illustrating a roof airbag for a vehicle according to another embodiment of the present disclosure.

FIG. 8 is a view seen from the top of the vehicle, illustrating the state in which the eccentric deployment of the airbag chamber during deployment is restrained by two pairs of tethers, resulting in normal deployment.

DETAILED DESCRIPTION

In describing the embodiments disclosed in the present specification, if it is determined that detailed descriptions of related known technologies may obscure the gist of the embodiments disclosed in the present specification, the detailed description thereof will be omitted. In addition, the accompanying drawings are only for easy understanding of the embodiments disclosed in the present specification so that the technical spirit disclosed herein is not limited by the accompanying drawings, so the accompanying drawings should be understood as covering all changes, equivalents, or substitutes included in the spirit and scope of the present disclosure.

It will be understood that although the terms "first", "second", etc. may be used herein to describe various elements, these elements should not be limited by these terms. These terms are only used to distinguish one element from another element.

As used herein, the singular forms "a", "an", and "the" are intended to include the plural forms as well, unless the context clearly indicates otherwise.

It will be further understood that the terms "comprises" and/or "comprising", or "includes" and/or "including", when used in this specification, specify the presence of stated features, integers, steps, operations, elements, components or combinations thereof, but do not preclude the presence or addition of one or more other features, integers, steps, operations, elements, components, or combinations thereof.

The suffixes "module" and "part" for the components used in the following description are given or interchanged in consideration of only the ease of constructing the specification, and do not have distinct meanings or functions by themselves.

It will be understood that when an element is referred to as being "connected" or "coupled" to another element, it can be directly connected or coupled to the other element or intervening elements may be present therebetween. In contrast, it will be understood that when an element is referred to as being "directly connected" to another element, there are no intervening elements present.

A controller may include a communication device that communicates with other controllers or sensors to control the corresponding functions, a memory that stores operating system or logic instructions and input/output information, and one or more processors that perform judgements, calculations, decisions, or the like necessary to control the corresponding functions.

Figure 1:
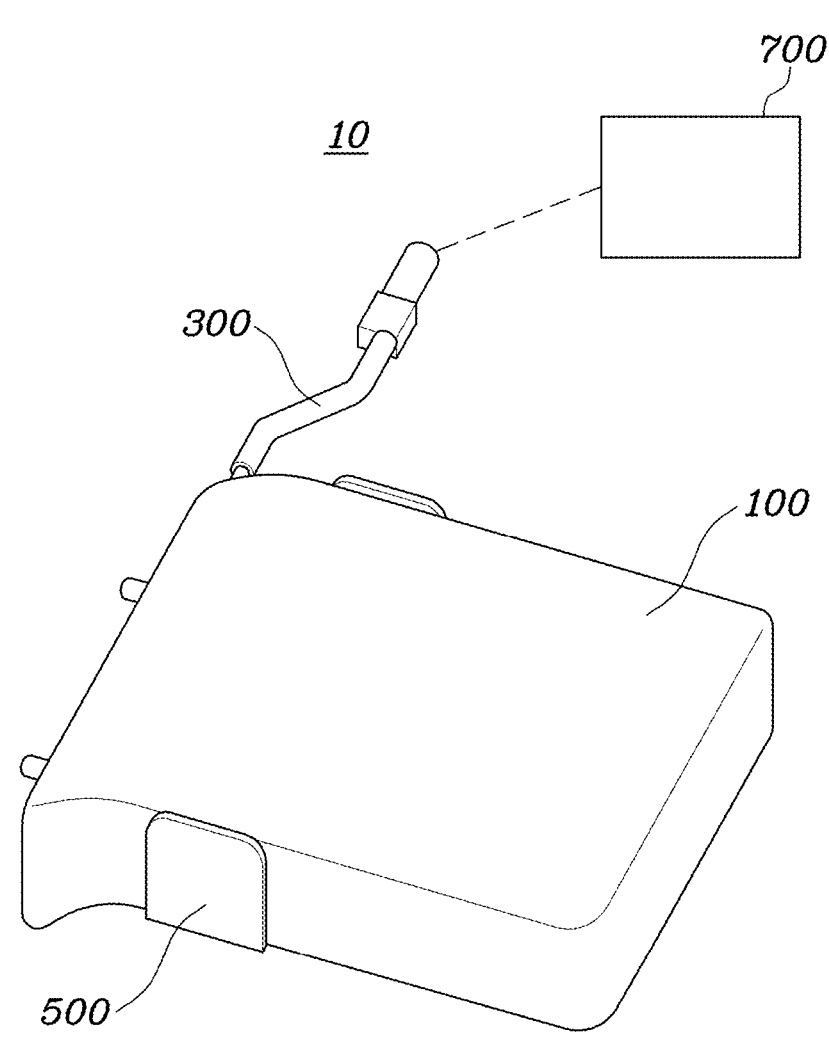
FIGS. 1 and 2 illustrate a roof airbag for a vehicle according to an embodiment of the present disclosure.
Figure 2:
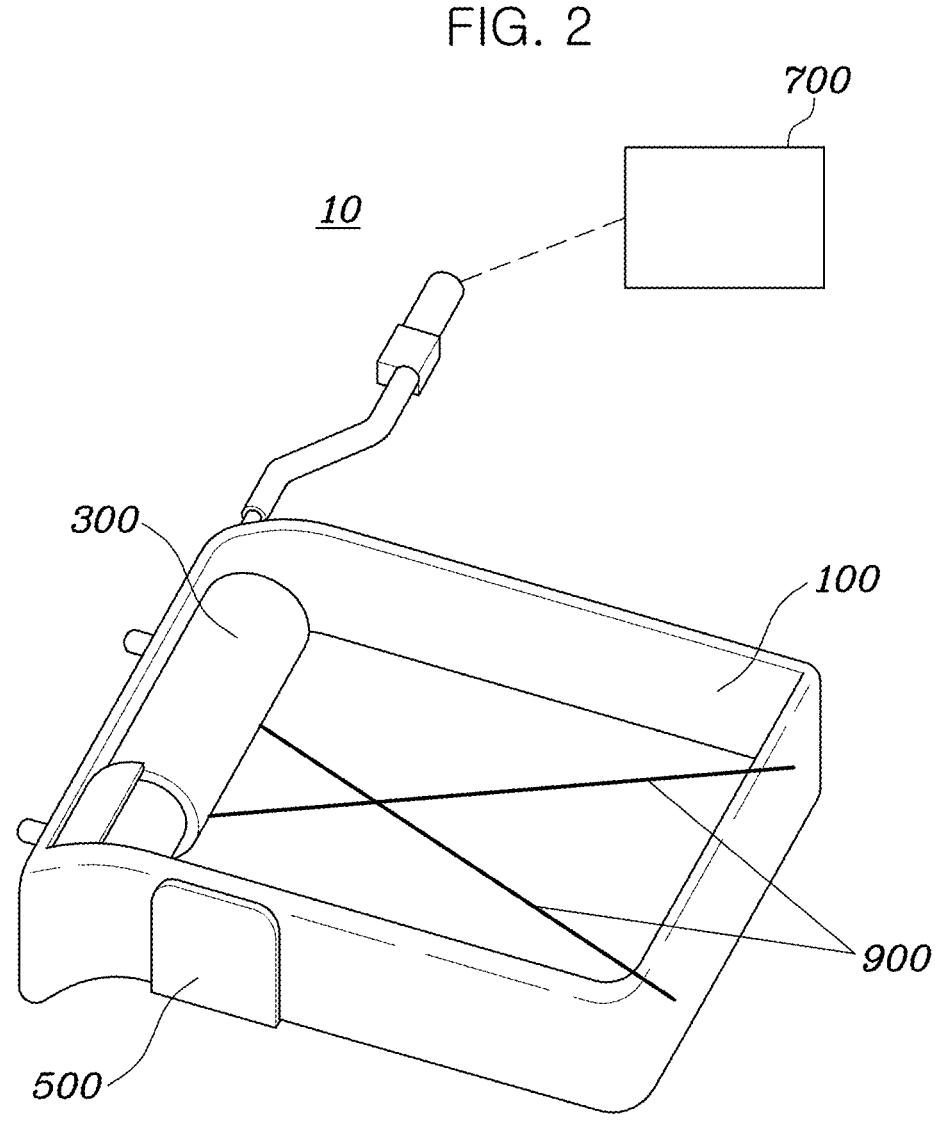
Figure 3:
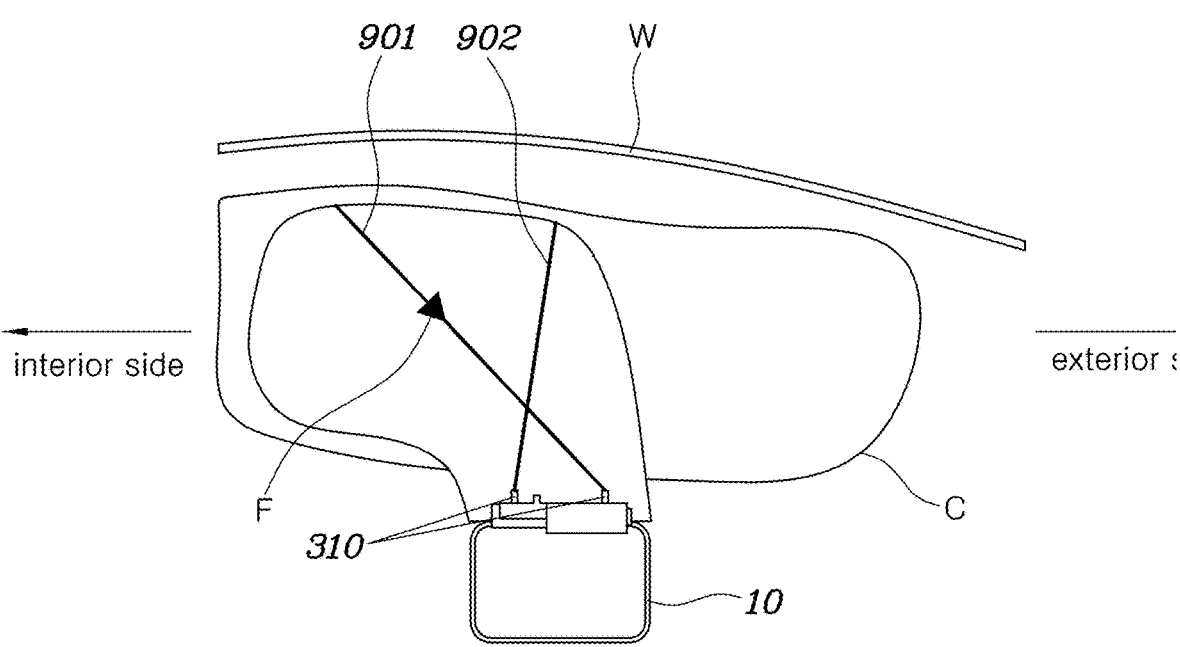
FIG. 3 is a view from the top of a vehicle, illustrating the eccentric deployment of an airbag chamber during deployment.
Figure 4:
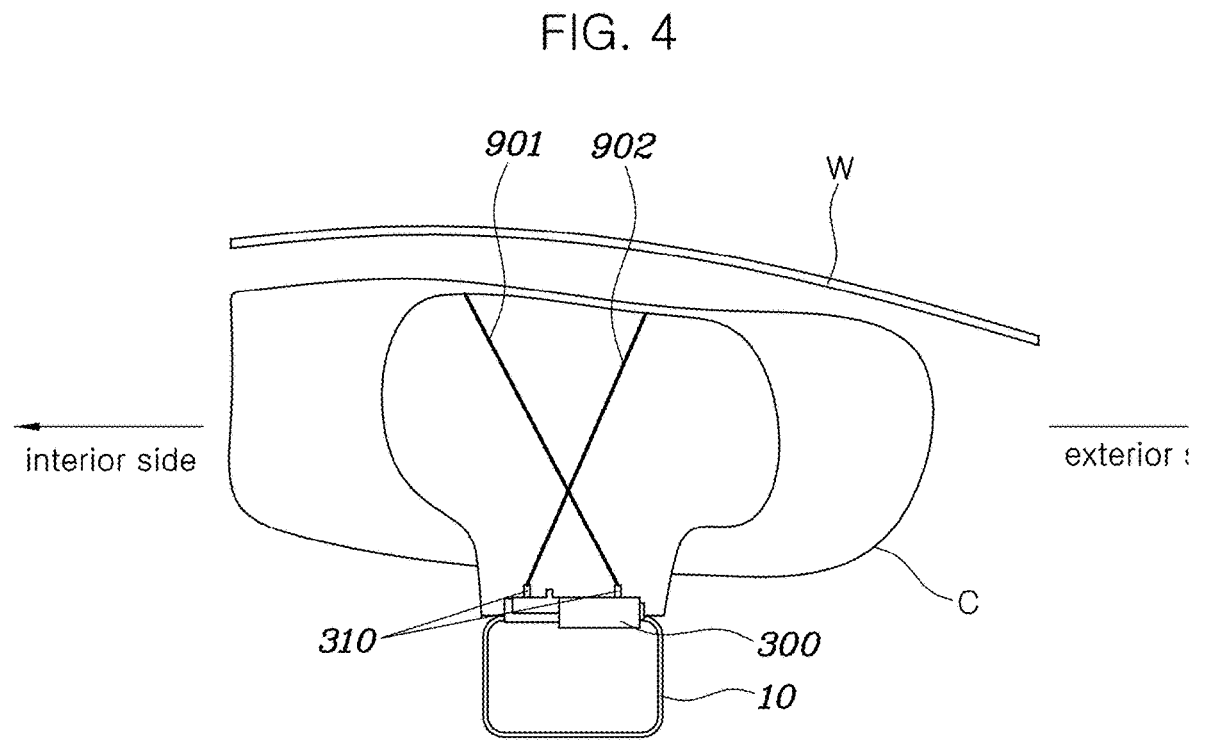
Figure 5:
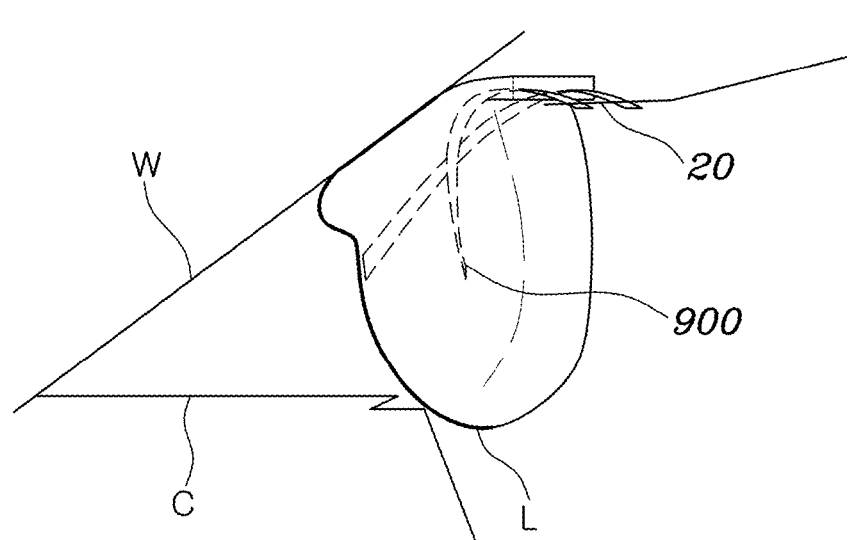
FIG. 5 is a view seen from the side of the vehicle, illustrating the state in which the airbag chamber is deployed.
Figure 6:
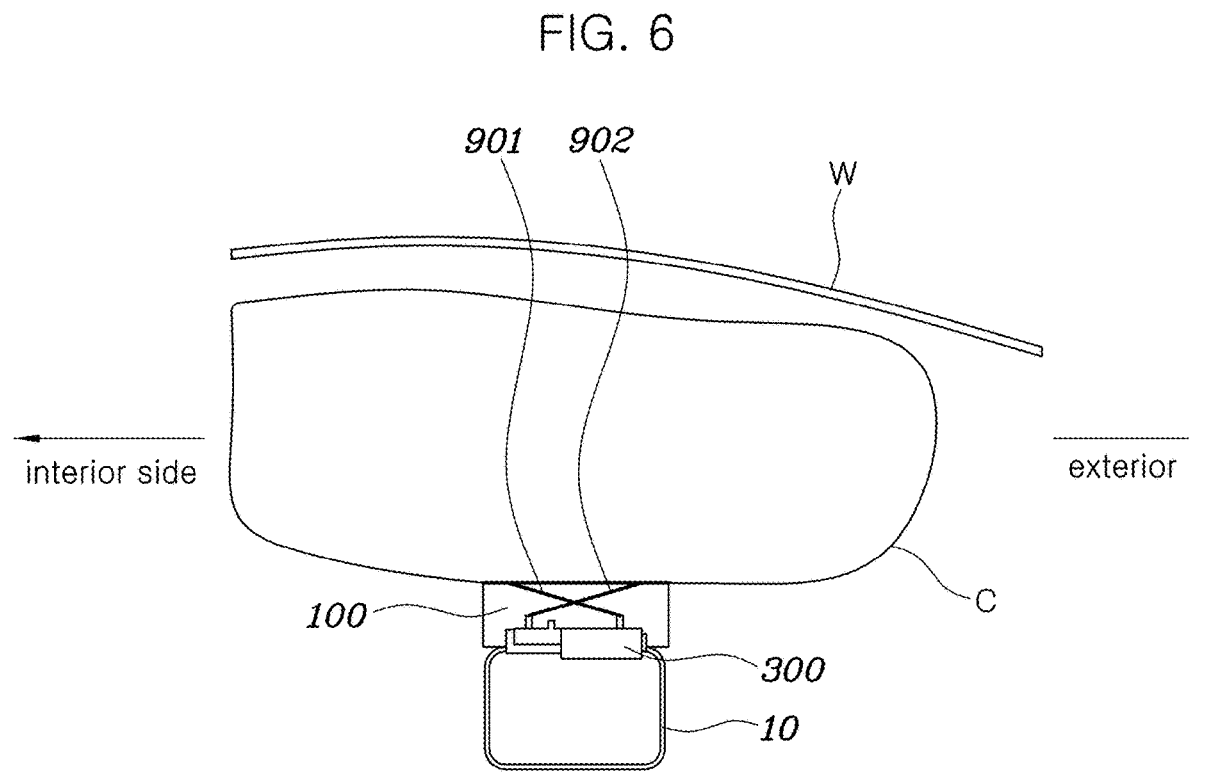
Figure 7:
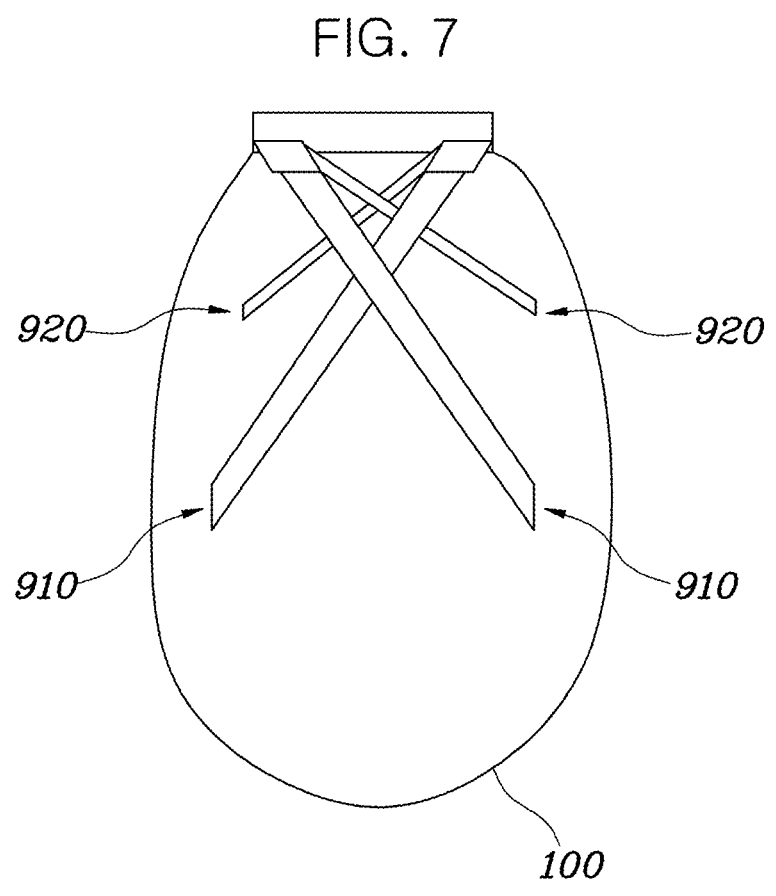
Figure 8:
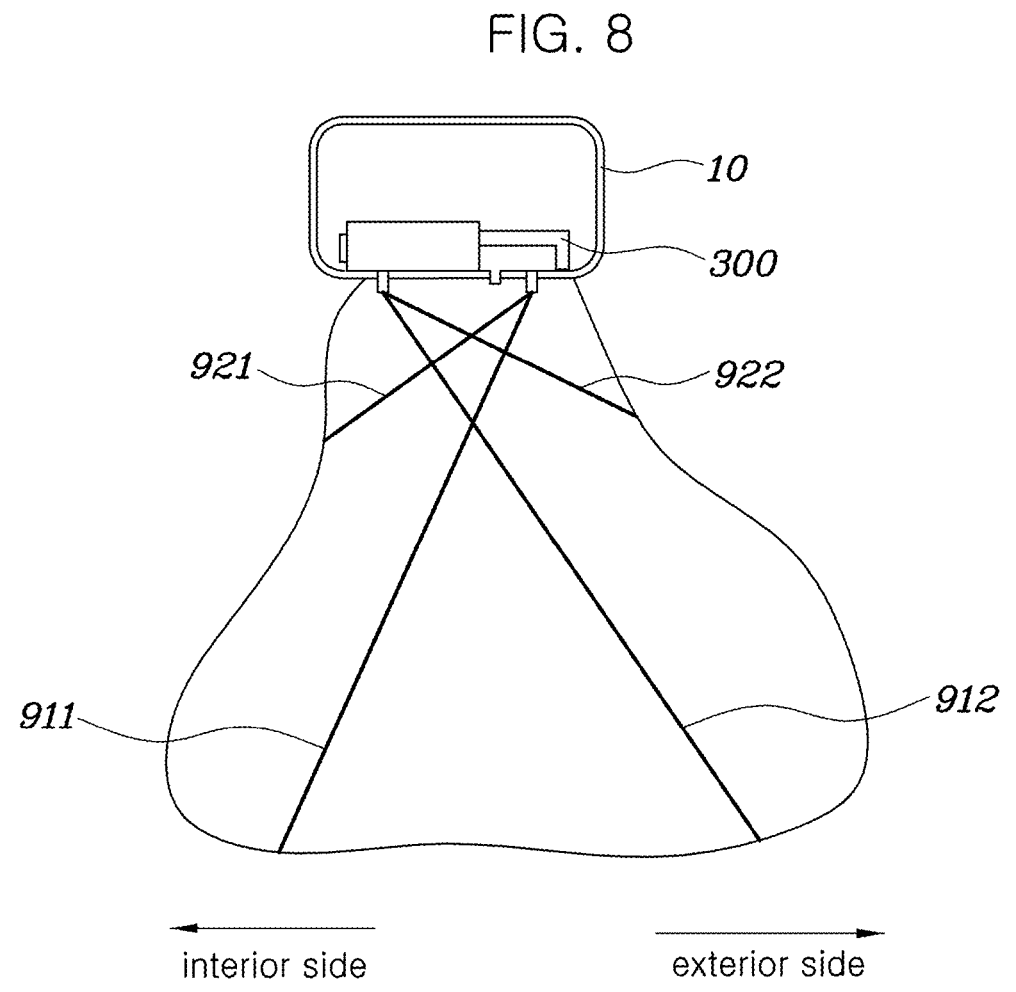

FIGS. 1 and 2 illustrate a roof airbag for a vehicle according to an embodiment of the present disclosure, FIG. 3 is a view from the top of a vehicle, illustrating the eccentric deployment of an airbag chamber during deployment, FIG. 4 is a view seen from the top of the vehicle, illustrating the state in which the eccentric deployment of the airbag chamber during deployment is restrained by a plurality of tethers, resulting in normal deployment, FIG. 5 is a view seen from the side of the vehicle, illustrating the state in which the airbag chamber is deployed, FIG. 6 is a view seen from the top of the vehicle, illustrating the normal situation before the airbag chamber is deployed, FIG. 7 is a view illustrating a roof airbag for a vehicle according to another embodiment of the present disclosure, and FIG. 8 is a view seen from the top of the vehicle, illustrating the state in which the eccentric deployment of the airbag chamber during deployment is restrained by two pairs of tethers, resulting in normal deployment.

Hereinafter, embodiments disclosed in the present specification will be described in detail with reference to the accompanying drawings, wherein the same or similar components are assigned the same reference numbers, and a redundant description thereof will be omitted.

FIGS. 1 and 2 illustrate a roof airbag for a vehicle according to an embodiment of the present disclosure. Referring to FIGS. 1 and 2, the roof airbag includes an airbag module 10 having an airbag chamber 100. The airbag module 10 may include an airbag chamber 100 that protects an occupant when deployed, an inflator 300 that deploys the airbag chamber 100, and a housing 500 that accommodates the airbag chamber 100 and the inflator 300.

As such, the inflator 300 and the airbag chamber 100 may be assembled in the housing 500 to form the airbag module 10. The inflator 300 may be electrically coupled to a controller 700 for deploying the airbag chamber 100. The controller 700 may control the inflator 300 by sending electrical signals to the inflator 300 to cause the inflator 300 to produce gases in the event of a vehicle collision.

The airbag module 10 may be arranged in a roof of a vehicle, more specifically, in a space above the headliner 20 that constitutes the roof. The airbag chamber 100 of the airbag module 10 may be arranged in the space above the headliner 20 in an orientation opposite the windshield glass W of the vehicle so that the airbag chamber 100 is deployable toward the windshield glass W of the vehicle. An end of the headliner 20 may form a tear line so that the end of the headliner 20 is torn by the deployment force of the airbag chamber 100 during deployment of the airbag chamber 100. Thus, the airbag module 10 is not normally exposed to the vehicle interior space, but the airbag chamber 100 may be deployed into the vehicle interior space while tearing the end of the headliner 20 during deployment of the airbag chamber 100.

In this way, the airbag chamber 100 of the roof airbag may be deployed into the interior space of the vehicle to prevent occupants from directly colliding with structures in the interior space of the vehicle, such as the crash pad C, windshield glass W, or the like.

However, as described above, the airbag chamber 100 of the roof airbag may not fully protect the occupants because the airbag chamber 100 may deploy eccentrically in a specified direction along the curvature of the windshield glass W while the vehicle is traveling, or may deploy eccentrically in a specified direction due to inertia. In other words, due to the eccentric deployment of the airbag chamber 100, only a portion of the occupant's body may impact the airbag chamber 100 while the rest of the body impacts the structure in the vehicle interior space, or the entirety of the occupant's body may impact the structure in the vehicle interior space.

To address these problems, a plurality of tethers 900 are provided within the airbag chamber 100 to prevent the eccentric deployment of the airbag chamber 100.

The plurality of tethers 900 are provided within the airbag chamber 100. First ends of the tethers 900 are connected to a fixed point of the airbag module 10. Second ends of the tethers 900 are connected to the inner side of the airbag chamber 100. Because the first ends of the tethers 900 are connected to the fixed point of the airbag module 10, upon deployment of the airbag chamber 100, the first ends of the tethers 900 are secured and the second ends of the tethers 900 are deployed together with the airbag chamber 100. The plurality of tethers 900 are arranged in the airbag chamber 100 in a way of crossing each other so that when the airbag chamber 100 is eccentrically deployed, one or more of the tethers 900 exert a force in a direction of restricting the eccentric deployment, allowing for normal deployment of the airbag chamber 100.

FIG. 3 is a view from the top of a vehicle, illustrating the eccentric deployment of an airbag chamber during deployment, and FIG. 4 is a view seen from the top of the vehicle, illustrating the state in which the eccentric deployment of the airbag chamber during deployment is restrained by a plurality of tethers, resulting in normal deployment.

That is, when the airbag chamber 100 is deployed eccentrically toward the interior side as illustrated in FIG. 3, one or more of the tethers 900 may restrict the eccentric deployment of the airbag chamber 100 by exerting a force F to pull the airbag chamber 100 in a direction opposite to the direction in which the airbag chamber 100 is deployed. In other words, even if the airbag chamber 100 is inclined to deploy eccentrically, as illustrated in FIG. 3, the plurality of tethers 900 may allow the airbag chamber to deploy normally as illustrated in FIG. 4.

First ends of the tethers 900 may be connected to the inflator 300. Specifically, the inflator 300 is partially located inside the airbag chamber 100, and studs 310 are provided on the inflator for securing the inflator 300 within the airbag module, so that the first ends of the tethers 900 are fixedly connected to the studs 310 of the inflator 300. Thus, when the airbag chamber 100 is deployed, the first ends of the tethers 900 are fixed at a point, and the other ends of the tethers 900 are deployed in response to the deployment of the airbag chamber 100.

The tethers 900 may be connected to the inflator 300 and the airbag chamber 100 in such a way that the first and second ends cross each other to prevent eccentric deployment of the airbag chamber 100. That is, to arrange the plurality of tethers 900 to cross each other, the first tethers are connected to the inflator 300 proximate to the vehicle interior side at the first ends and to the airbag chamber 100 proximate to the vehicle exterior side at the second ends. At the same time, the second tethers are connected to the inflator proximate to the vehicle exterior side at the first ends, and to the airbag chamber proximate to the vehicle interior side at the second ends. At this time, forming the tethers to have an appropriate length prevents the eccentric deployment of the airbag chamber 100 because the tethers connected at one ends to the inflator 300 proximate to the vehicle exterior side may restrain the eccentric deployment of the airbag chamber 100 when the airbag chamber 100 eccentrically deploys toward the vehicle interior side. In addition, when the airbag chamber 100 eccentrically deploys toward the vehicle exterior side, the tethers connected at one ends to the inflator 300 proximate to the vehicle interior side may restrain the eccentric deployment of the airbag chamber 100. As such, the plurality of tethers 900 arranged to cross within the airbag chamber 100 may control the direction in which the airbag chamber 100 deploys during abnormal deployment of the airbag chamber 100.

The tethers 900 may essentially be a single pair of tethers 900. First ends of the pair of tethers 900 may be connected to the inflator 300 and positioned in the same plane, and second ends of the pair of tethers 900 may be positioned at the same height or at different heights. Here, the connection height in the airbag chamber of the second ends of the tethers 900 may be defined as the straight-line distance of the second ends of the tethers 900 from the ground after the airbag chamber 100 is fully deployed, i.e., the shortest distance of the second ends of the tethers 900 from the ground.

Because the airbag chamber 100 is zigzag-folded or roll-folded and stored in the housing 500 in the normal state, it is preferable to describe the connection height of the second ends of the tethers 900 with the airbag chamber 100 deployed because it would be unclear to describe the connection point of the second ends of the tethers 900 within the airbag chamber 100 with the airbag chamber 100 folded.

Specifically, to describe the point at which the second ends of the tethers 900 connect within the airbag chamber 100, when the airbag chamber 100 is deployed, the second ends of the tethers 900 may be located at either the lowermost end of the airbag chamber 100 or the contact point of the windshield glass W and the airbag chamber 100, or anywhere in between.

FIG. 5 is a view seen from a side of the vehicle, illustrating the deployment of the airbag chamber.

Referring to FIG. 5, when the airbag chamber 100 is deployed, the point of contact with the windshield glass W and the lowermost point of the airbag chamber 100 may be identified. It may also be seen that the first ends of the tethers 900 are connected to a fixed point on the airbag module 10. The second ends of the tethers 900 may be connected to any point of the line L illustrated in FIG. 5. Line L is a curved line forming the shape of the airbag chamber 100, which connects from a highest contact point of the airbag chamber with the windshield glass W to the lowermost point of the airbag chamber 100 after the deployment of the airbag chamber 100.

It is sufficient if the plurality of tethers 900 are connected to the line L at the second ends. Specifically, when the plurality of tethers 900 are connected to the midpoint of the line L at the second ends, it is possible to reliably restrict the eccentric deployment of the airbag chamber 100.

The tethers of the pair of tethers 900 may have the same length, or alternatively, the tethers of the pair of tethers 900 may be configured to have different lengths. However, the tethers of the pair of tethers 900 should always be oriented to cross each other. The relationship between the length of the tethers 900 and regulating the deployment shape of the airbag chamber will now be described.

The regulation of the deployment shape of the airbag chamber is associated with the length of the tethers and the connection location of the second ends of the tethers in the airbag chamber.

The plurality of tethers may have the same length but may be connected at different heights in the airbag chamber. Here, different heights of connection in the airbag chamber mean different heights of the point at which the second ends of the tethers are positioned in the line L. Also, the plurality of tethers 900 may have different lengths, even if the points where the second ends of the tethers are located in the line L are the same height.

By varying the connection points within the airbag chamber 100 of the plurality of tethers 900, or by varying the length of the plurality of tethers 900, the regulation of the deployment direction of the airbag chamber 100 may be controlled.

For example, varying the length of the tethers 900 to regulate the deployment direction of the airbag chamber 100 will be described. FIG. 6 is a view seen from the top of the vehicle, illustrating the normal situation before the airbag chamber is deployed.

Referring to FIG. 6, a pair of tethers 900 are provided within the airbag chamber 100, wherein each tether 900 may be defined by whether the second end of the tether is proximate to the vehicle interior side or the vehicle exterior side. That is, the pair of tethers may be defined as a vehicle interior side tether 901 with the second end facing the vehicle interior side and a vehicle exterior side tether 902 with the second end facing the vehicle exterior side.

The interior side tether 901 may be shorter than the exterior side tether 902. Because the interior side tether 901 is shorter than the exterior side tether 902, the eccentric deployment of the airbag chamber 100 toward the vehicle interior side may be restricted. That is, by making the length of the interior side tether 901 shorter than the length of the exterior side tether 902, the propensity of the airbag chamber 100 to deploy toward the interior side is restricted because the extent to which the airbag chamber 100 may deploy toward the interior side is limited by the interior side tether 901 even if the airbag chamber 100 attempts to deploy toward the interior side.

Note that although the lengths of a pair of tethers illustrated in the drawings appear to be the same and similar, the tethers are typically loosely disposed within the airbag chamber and deploy together upon deployment of the airbag chamber, so this should be taken into account.

As such, the length of the plurality of tethers may be adjusted to more precisely regulate the deployment of the airbag chamber.

Similarly, even if the lengths of the plurality of tethers are the same, substantially varying the connection heights within the airbag chamber 100 at the second ends of the tethers may allow for more precise regulation of the deployment of the airbag chamber.

In an embodiment of the present disclosure, the tethers are provided in a single pair. However, in another embodiment of the present disclosure, the tethers may be provided in two or more pairs. For example, two pairs of tethers may be arranged in the airbag chamber. The tethers may be defined as a pair of first tethers 910 and a pair of second tethers 920, wherein the first tethers 910 and the second tethers 920 may be defined by respective lengths. That is, the first tethers 910 are longer than the second tethers 920, and the second tethers 920 are shorter than the first tethers 910.

FIG. 7 is a view illustrating a roof airbag for a vehicle according to another embodiment of the present disclosure, and FIG. 8 is a view seen from the top of the vehicle, illustrating the state in which the eccentric deployment of the airbag chamber during deployment is restrained by two pairs of tethers, resulting in normal deployment.

Referring to FIGS. 7 and 8, the embodiment with two pairs of tethers may provide more stable deployment of the airbag chamber 100 over the embodiment with a single pair of tethers. With the airbag chamber 100 deployed, the second ends of the first tethers 910 are positioned lower than the second ends of the second tethers 920, and the second ends of the second tethers 920 are positioned higher than the second ends of the first tethers 910, so that the airbag chamber 100 may maintain the three-dimensional shape, and restrict the eccentric deployment as well.

At this time, both the first ends of the first tether 910 and the second tether 920 are fixedly connected to the inflator 300. Exemplarily describing the connection height of the second ends of the tethers, the second ends of the first tethers 910 may be positioned at the lowermost end of the airbag chamber 100 when the airbag chamber 100 is deployed, and the second ends of the second tethers 920 may be positioned at a contact point of the windshield glass W and the airbag chamber 100 when the airbag chamber 100 is deployed.

The tethers of the pair of first tethers 910 may have the same or different length. This is also true for the tethers of the pair of second tethers 920. Additionally, the tethers of the pair of first tethers 910 may have the same or different connection height within the airbag chamber 100. This is also true for the tethers of the pair of second tethers 920. It will be appreciated that the deployment geometry of the airbag chamber 100 may be finely regulated in other embodiments by adjusting the length of the tethers, or by adjusting the connection height of the second ends of the tethers within the airbag chamber 100.

That is, as in one embodiment of the present disclosure, in another embodiment of the present disclosure, each tether of the first tethers 910 may be defined by whether the second end of the first tether 910 is closer to the vehicle interior side or the vehicle exterior side. This is also true for the second tethers 920. Thus, the pair of first tethers 910 may be defined as a first vehicle interior side tether 911 having a second end facing the vehicle interior side and a first vehicle exterior side tether 912 having a second end facing the vehicle exterior side. In addition, the pair of second tethers 910 may be defined as a second vehicle interior side tether 921 having a second end facing the vehicle interior side and a second vehicle exterior side tether 922 having a second end facing the vehicle exterior side.

In this case, the first interior side tether 911 may be shorter than the first exterior side tether 912, and the second interior side tether 921 may be shorter than the second exterior side tether 922. In other words, by making the lengths of the interior side tethers 911, 921 shorter than the lengths of the exterior side tethers 912, 922, the propensity of the airbag chamber 100 to deploy toward the interior side is suppressed because the interior side tethers 911 and 921 limit the extent to which the airbag chamber 100 may deploy toward the interior side even if the airbag chamber 100 attempts to deploy toward the interior side.

As such, the length of the tethers may be adjusted to further regulate the deployment of the airbag chamber 100.

While the present disclosure has been described and illustrated with respect to the specific embodiments, it would be obvious to those skilled in the art that various improvements and modifications are possible, without departing from the scope and spirit of the present disclosure as disclosed in the accompanying claims.

What is claimed is:

1. A roof airbag for a vehicle, comprising:

an airbag module arranged on a roof adjacent a windshield glass of the vehicle and including an airbag chamber; and a plurality of tethers arranged in the airbag chamber in a manner of crossing each other, each of the tethers having a first end connected to an inflator of the airbag module and a second end connected to an inner side of the airbag chamber to deploy together during deployment of the airbag chamber, wherein the tethers include a pair of first tethers and a pair of second tethers disposed at different vertical heights within the airbag chamber so as to maintain a three-dimensional deployment shape of the airbag chamber when deployed.

2. The roof airbag for a vehicle of claim 1, wherein the airbag chamber is deployed toward the windshield glass.

3. The roof airbag for a vehicle of claim 1, wherein the airbag module comprises:

an airbag housing in which the airbag chamber is arranged; and wherein the inflator is arranged in the airbag housing and configured to supply gases to the airbag chamber.

4. The roof airbag for a vehicle of claim 1, wherein when the airbag chamber is deployed, the second end of each tether is disposed at a lowermost end of the airbag chamber, a contact point of the airbag chamber with the windshield glass, or a point therebetween.

5. The roof airbag for a vehicle of claim 1, wherein the first ends of the tethers are provided on a same plane.

6. The roof airbag for a vehicle of claim 1, wherein the second ends of the first tethers are located at a lowermost end of the airbag chamber when the airbag chamber is deployed.

7. The roof airbag for a vehicle of claim 1, wherein the tethers of the first pair of tethers have different lengths and the tethers of the second pair of tethers have different lengths.

8. The roof airbag for a vehicle of claim 7, wherein each pair of tethers comprises a vehicle interior side tether having an end facing the vehicle interior side, and a vehicle exterior side tether having an end facing the vehicle exterior side, wherein the vehicle interior side tether is shorter than the vehicle exterior side tether.

9. The roof airbag for a vehicle of claim 1, wherein the second tethers are shorter than the first tethers.

10. The roof airbag for a vehicle of claim 9, wherein the second ends of the second tethers are disposed higher than the second ends of the first tethers when the airbag chamber is deployed.

11. The roof airbag for a vehicle of claim 9, wherein second ends of the first tethers are located at a lowermost end of the airbag chamber when the airbag chamber is deployed, and the second ends of the second tethers are located at a contact point of the windshield glass with the airbag chamber when the airbag chamber is deployed.

12. The roof airbag for a vehicle of claim 9, wherein the pair of first tethers comprises a first vehicle interior side tether having an end facing the vehicle interior side, and a first vehicle exterior side tether having an end facing the vehicle exterior side, wherein the first vehicle interior side tether is shorter than the first vehicle exterior side tether.

13. The roof airbag for a vehicle of claim 9, wherein the pair of second tethers comprises a second vehicle interior side tether having an end facing the vehicle interior side, and a second vehicle exterior side tether having an end facing the vehicle exterior side, wherein the second vehicle interior side tether is shorter than the second vehicle exterior side tether.

14. The roof airbag for a vehicle of claim 1, wherein the airbag module is arranged in a space above a headliner.

15. The roof airbag for a vehicle of claim 1, wherein the first end of each tether is fixed to a stud of the inflator disposed within the airbag module.

16. A roof airbag for a vehicle, comprising:

an airbag module arranged on a roof adjacent a windshield glass of the vehicle and including an airbag chamber; and a plurality of tethers arranged in the airbag chamber in a manner of crossing each other, each of the tethers having a first end connected to an inflator of the airbag module and a second end connected to an inner side of the airbag chamber to deploy together during deployment of the airbag chamber, wherein the tethers comprise a pair of tethers having different lengths to control a deployment direction of the airbag chamber.

17. The roof airbag for a vehicle of claim 16, wherein the pair of tethers comprises a vehicle-interior-side tether shorter than a vehicle-exterior-side tether so as to suppress eccentric deployment of the airbag chamber toward the vehicle interior side.

18. A roof airbag for a vehicle, comprising:

an airbag module arranged on a roof adjacent a windshield glass and including an airbag chamber;

an inflator disposed within the airbag module; and a plurality of tethers each having a first end fixed to a stud of the inflator and a second end connected to an inner surface of the airbag chamber, the tethers crossing each other to suppress eccentric deployment of the airbag chamber, wherein the tethers include first and second pairs disposed at different heights to maintain a three-dimensional deployment shape.

19. The roof airbag for a vehicle of claim 18, wherein each of the pair of first tethers and the pair of second tethers respectively comprise a vehicle-interior-side tether and a vehicle-exterior-side tether, the vehicle-interior-side tether being shorter than the vehicle-exterior-side tether.

* * * * *